(12) United States Patent
Parish et al.

(10) Patent No.: US 12,709,925 B2
(45) Date of Patent: Aug. 18, 2026

(54) AIRCRAFT INTERIOR ASSEMBLY

(71) Applicant: Safran Seats GB Limited, Cwmbran (GB)

(72) Inventors: Daniel Parish, Cwmbran (GB); Mark Douglas, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 211 days.

(21) Appl. No.: 18/687,667

(22) PCT Filed: Aug. 25, 2022

(86) PCT No.: PCT/GB2022/052182
§ 371 (c)(1),
(2) Date: Feb. 28, 2024

(87) PCT Pub. No.: WO2023/031581
PCT Pub. Date: Mar. 9, 2023

(65) Prior Publication Data

US 2024/0360708 A1 Oct. 31, 2024

(30) Foreign Application Priority Data

Sep. 1, 2021 (GB) ...................................... 2112451

(51) Int. Cl.
*E05C 3/04* (2006.01)
*B64D 11/06* (2006.01)

(52) U.S. Cl.
CPC .............. *E05C 3/043* (2013.01); *B64D 11/06* (2013.01)

(58) Field of Classification Search
CPC ................................ E05C 3/043; B64D 11/06
See application file for complete search history.

(56) References Cited

U.S. PATENT DOCUMENTS

2017/0283067 A1 10/2017 Darbyshire et al.
2020/0122838 A1 4/2020 Bonnefoy et al.

FOREIGN PATENT DOCUMENTS

CN 108699864 A * 10/2018
WO 2017066559 A1 4/2017

(Continued)

OTHER PUBLICATIONS

International Patent Application No. PCT/GB2022/052182, International Search Report and Written Opinion, dated Dec. 5, 2022.

*Primary Examiner* — Anthony D Barfield
(74) *Attorney, Agent, or Firm* — Kilpatrick Townsend & Stockton LLP

(57) ABSTRACT

An aircraft interior assembly comprising a fixed element, a sliding element movable between a lockable position and a released position, and a latch mechanism. The latch mechanism comprises a locking arm, mounted on one of the fixed element and the sliding element, which is rotatable around a rotating axis between a locked position and an unlocked position. The latch mechanism further comprises an engagement plate, mounted on the other of the fixed element and the sliding element. When the sliding element is in the lockable position and the locking arm is in the locked position, the locking arm contacts the engagement plate to prevent the sliding element moving out of the lockable position. Conversely, when the sliding element is in the lockable position and the locking arm is in the unlocked position, the locking arm is not in contact with the engagement plate, and the sliding element is free to move out of the lockable position.

14 Claims, 9 Drawing Sheets

(56) References Cited

FOREIGN PATENT DOCUMENTS

| | | | |
|---|---|---|---|
| WO | 2018184778 | A1 | 10/2018 |
| WO | 2021084470 | A1 | 5/2021 |

* cited by examiner

AIRCRAFT INTERIOR ASSEMBLY

BACKGROUND OF THE INVENTION

The present invention concerns an aircraft interior assembly. More particularly, but not exclusively, the invention concerns a latch mechanism for an aircraft interior assembly comprising a fixed element and a sliding element.

Latches are often required on assemblies provided in the interior of aircraft, for example to retain a door of a furniture assembly in a particular position. Various types of latch are known, and these types include single, dual and triple latches. However, with known latches the housing of the latch often limits the distance the latch can move, in turn limiting the distance there can be between the latch and the part of the assembly it is retaining in position. As within an aircraft interior size and position limitations can be paramount, this can mean it is not be feasible to use such latches.

The present invention seeks to mitigate the above-mentioned problems. Alternatively and/or additionally, the present invention seeks to provide an improved aircraft interior assembly.

SUMMARY OF THE INVENTION

In accordance with a first aspect of the invention there is provided an aircraft interior assembly comprising:

- a fixed element;
- a sliding element movable between a lockable position and a released position;
- a latch mechanism comprising:
  - a locking arm, mounted on one of the fixed element and the sliding element, the locking arm having an engagement end and being rotatable around a rotating axis between a locked position and an unlocked position;
  - an engagement plate mounted on the other of the fixed element and the sliding element, the engagement plate comprising an engaging surface;

wherein when the sliding element is in the lockable position and the locking arm is in the locked position, the engagement end of the locking arm contacts the engaging surface of the engagement plate to prevent the sliding element moving out of the lockable position; and wherein when the sliding element is in the lockable position and the locking arm is in the unlocked position, the engagement end of the locking arm is not in contact with the engaging surface of the engagement plate so that the sliding element is free to move out of the lockable position.

By having the latch mechanism use a locking arm rotatable about an axis, the distance between the housing of the locking arms and the part of the aircraft interior assembly it engages, i.e. the engagement plate, is not limited. In particular, parts in difficult to reach positions can be latched, simply by making the locking arms of sufficient length. Further, the latch mechanism does not require a large visible latch body.

The locking arm may be mounted on the fixed element, and the engagement plate mounted on the sliding element. Alternatively, the locking arm may be mounted on the sliding element, and the engagement plate mounted on the fixed element.

The sliding element may be movable in a plane perpendicular to the rotating axis of the locking arm. The sliding element may be movable linearly, i.e. in a straight line, along a curve, or in any other appropriate way.

The end of the locking arm opposite the engagement end may comprise a locking area which when pushed rotates the locking arm into the locked position. The end of the locking arm opposite the engagement end may additionally or alternatively comprises an unlocking area which when pushed rotates the locking arm into the unlocked position. The end of the locking arm opposite the engaging end may comprise a rocker. The use of a locking area, unlocking area and/or rocker allow easy movement of the locking arm between the locked position and unlocked position.

The surface of the engagement end of the locking arm may be an arc of a circle having as its centre the rotating axis of the locking arm. This means that, when the locking arm is rotated between the locked and unlocked positions, the surface of the engagement end will move along that circle.

The engaging surface of the engagement plate may be shaped such that, when the sliding element is in the lockable position, the surface is an arc of a circle having as its centre the rotating axis of the locking arm. When the surface of the engagement end of the locking arm is also an arc of a circle having as its centre the rotating axis of the locking arm, this means that the two surfaces can be aligned with each other, and further will remain aligned when the locking arm is rotated between the locked and unlocked positions.

The engagement plate may be adjustably mounted on the fixed element or sliding element so that the distance between the engaging surface of the engagement plate and the rotating axis of the locking arm can be increased or decreased. This allows the latch mechanism to be easily adjusted.

The locking arm may be removably mounted on the fixed element or sliding element. This allows easy maintenance and replacement of the locking arm.

The aircraft interior assembly may be arranged so that, when the sliding element is in the released position and the locking arm is in the locked position, the movement of the sliding element into the lockable position causes the locking arm to be rotated out of the locked position. The aircraft interior assembly may be arranged so that during the movement of the sliding element into the lockable position the engagement plate is brought into contact with the locking arm to rotate the locking arm out of the locked position. This means that the locking arm being in the locked position when the sliding element is not in the lockable position will not prevent it being moved into the lockable position.

The locking arm may be biased to return to the locked position. Alternatively, the latch mechanism may comprise biasing means to keep the locking arm in the unlocked position when put in that position. The locking arm may also comprise biasing means to keep the locking arm in the locked position when put in that position.

The sliding element may be a sliding door.

The aircraft interior assembly may be an aircraft furniture assembly. The aircraft interior assembly may be an aircraft seat assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
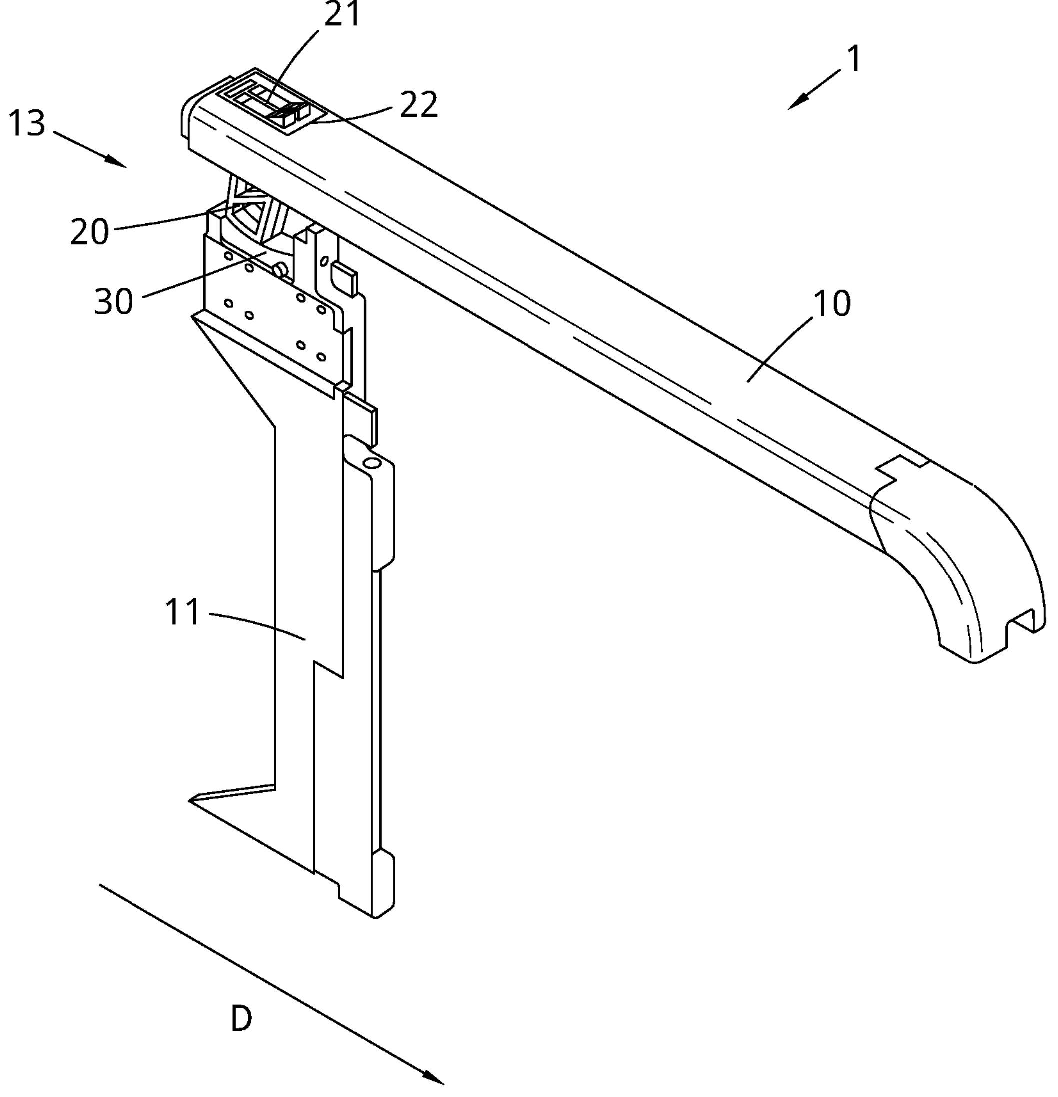
FIG. 1 shows a perspective view of an aircraft interior assembly in accordance with a first embodiment of the invention.

An aircraft interior assembly in accordance with a first embodiment of the invention is shown in FIG. 1. The aircraft interior assembly 1 comprises a fixed element 10, a sliding element 11, and a latch mechanism 13.

The aircraft interior assembly 1 is part of an aircraft seat assembly (not shown). The fixed element 10 is mounted on the other parts of the aircraft seat assembly so that it is fixed in position with respect to the interior of the aircraft. The sliding element 11 has a panel mounted on it which provides a door covering an entrance to the interior of the aircraft seat assembly. The sliding element 11 is mounted on rails of the aircraft seat assembly, so that it can be moved linearly with respect to the interior of the aircraft, and the other parts of the aircraft seat assembly including in particular the fixed element 10. In particular, the sliding element 11 is movable in direction D between a lockable position as shown in FIG. 1, in which the door is not deployed and does not cover the entrance, and a released position, in which the door is deployed to cover the entrance.

The latch mechanism 13 comprises locking arms 20 mounted in a housing 22 in the fixed element 10, and an engagement plate 30 mounted on the sliding element 11. The locking arms 20 can engage with the engagement plate 30 to retain the sliding element 11 in the lockable position, as described in more detail below.

Figure 2A:
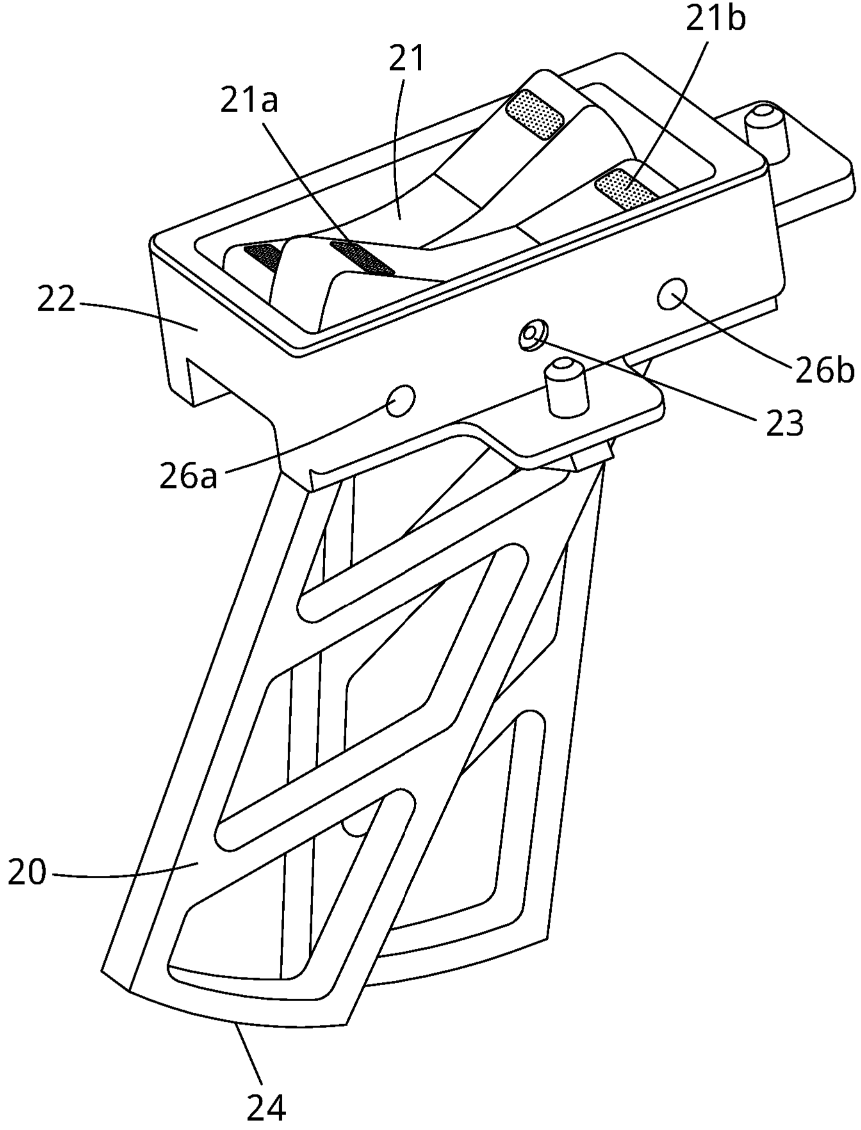
FIG. 2*a* shows a perspective view of locking arms of a latch mechanism of the aircraft interior assembly of FIG. 1 in a housing.
Figure 2B:
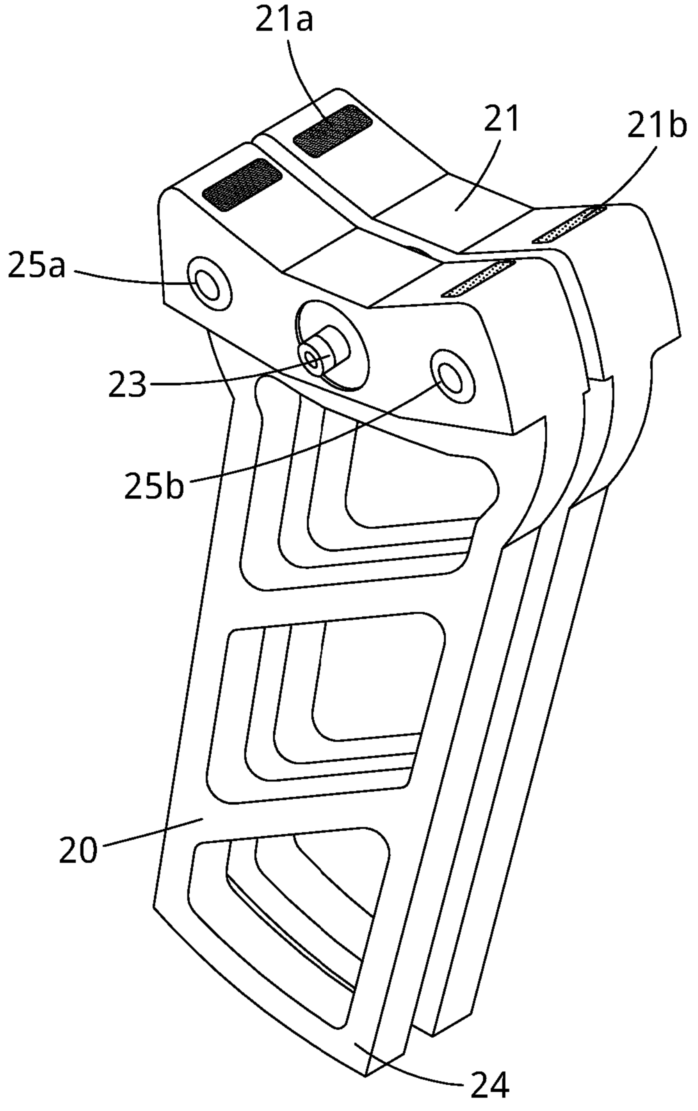
FIG. 2*b* shows a perspective view of the locking arms of the latch mechanism of the aircraft interior assembly of FIG. 1 without the housing.
Figure 3:
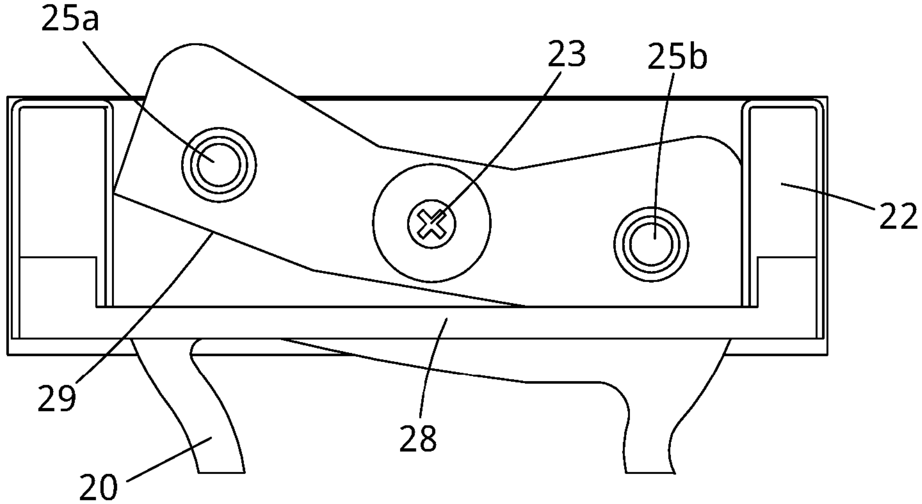
FIG. 3 shows a side view of a part of the locking arms of the latch mechanism of the aircraft interior assembly of FIG. 1 and the housing.

The locking arms 20 are shown in more detail in FIGS. 2*a*, 2*b* and 3. As can be seen, there are two locking arms 20 which can be moved independently, as shown in FIG. 2*a*. However, both locking arms 20 engage the same engagement plate 30, and two locking arms 20 are provided for redundancy to help prevent the sliding element being released by accident. In other embodiments a single locking arm may be provided to engage the engagement plate, or multiple locking arms may each engage separate engagement plate, allowing multiple sliding elements to be separately retained or released.

As shown in FIG. 2*a*, the locking arms 20 are mounted in a housing 22 by a pivot 23, so that they are rotatable around a rotating axis defined by the pivot 23. FIG. 2*b* shows the locking arms 20 without the housing 22.

At the top of each of the locking arms 20 is a rocker 21, with a locking area 21*a* and an unlocking area 21*b*. When a force is exerted on the locking area 21*a* of a locking arm 20, the locking arm 20 is rotated anticlockwise around the pivot 23 into a locked position. Conversely, when a force is exerted on the unlocking area 21*b* of a locking arm 20, the locking arm 20 is rotated clockwise around the pivot 23 into an unlocked position. The opposite end of each locking arm is an engagement end 24, which engages with the engagement plate 30 as described below. The surface of the engagement end 24 is curved, with the curve being an arc of the circle which has as its centre the rotating axis of the locking arms 20.

Each locking arms 20 has on its side adjacent to the housing 22 sprung ball detents 25*a* and 25*b*. The housing 22 has corresponding recesses 26*a* and 26*b*. The ball detent 25*a* and the corresponding recess 26*a* are on the same side of the pivot 23 as the locking area 21*a*, and are respectively positioned so that, when the locking arm 20 is in the locked position, the ball detent 25*a* and recess 26*a* are aligned so that the ball detent 25*a* extends into the recess 26*a*. In this way, when in the locked position the locking arm 20 is held in place by the ball detent 25*a*. However, when sufficient force is applied to the unlocking area 21*b*, the ball detent 25*a* is forced out of the recess 26*a*, allowing the locking arm 20 to move towards the unlocked position.

Similarly, the ball detent 25*b* and the corresponding recess 26*b* are on the same side of the pivot 23 as the unlocking area 21*b*, and are respectively positioned so that, when the locking arm 20 is in the unlocked position, the ball detent 25*b* and recess 26*b* are aligned so that the ball detent 25*b* extends into recess 26*b*. Similarly again, in this way when the locking arm 20 is in the unlocked position, it is held in place by the ball detent 25*b*; and when sufficient force is applied to the locking area 21*a*, the ball detent 25*b* is forced out of the recess 26*b*, allowing the locking arm 20 to move towards the locked position.

FIG. 3 shows the top part of the locking arms 20 within the housing 22. The housing 22 comprises in its interior a blocker 28, which as can be seen extends below the top part of the locking arms 20. Further, the top part of the locking arms 20 is wider than the bottom of the locking arms 20, so that it extends further outwards in the direction of the rotational axis of the pivot 23 to create a ledge 29 along the bottom of the top part of the locking arms 20. The ledge 29 is shaped so that it meets the blocker 28 when the locking arms 20 are fully in either the locked position or the unlocked position, and thus the blocker 28 prevents the locking arms 20 from rotating beyond the locked position or the unlocked position, for example if the ball detent 25*a* or 25*b* were to fail.

As the locking arms 20 are mounted in the housing 22 which is in turn mounted on the fixed element 11, the locking arms 20 and housing 22 can easily be removed together from the fixed element 11 as a single part, allowing easy maintenance and replacement of the locking arms 20.

Figure 4A:
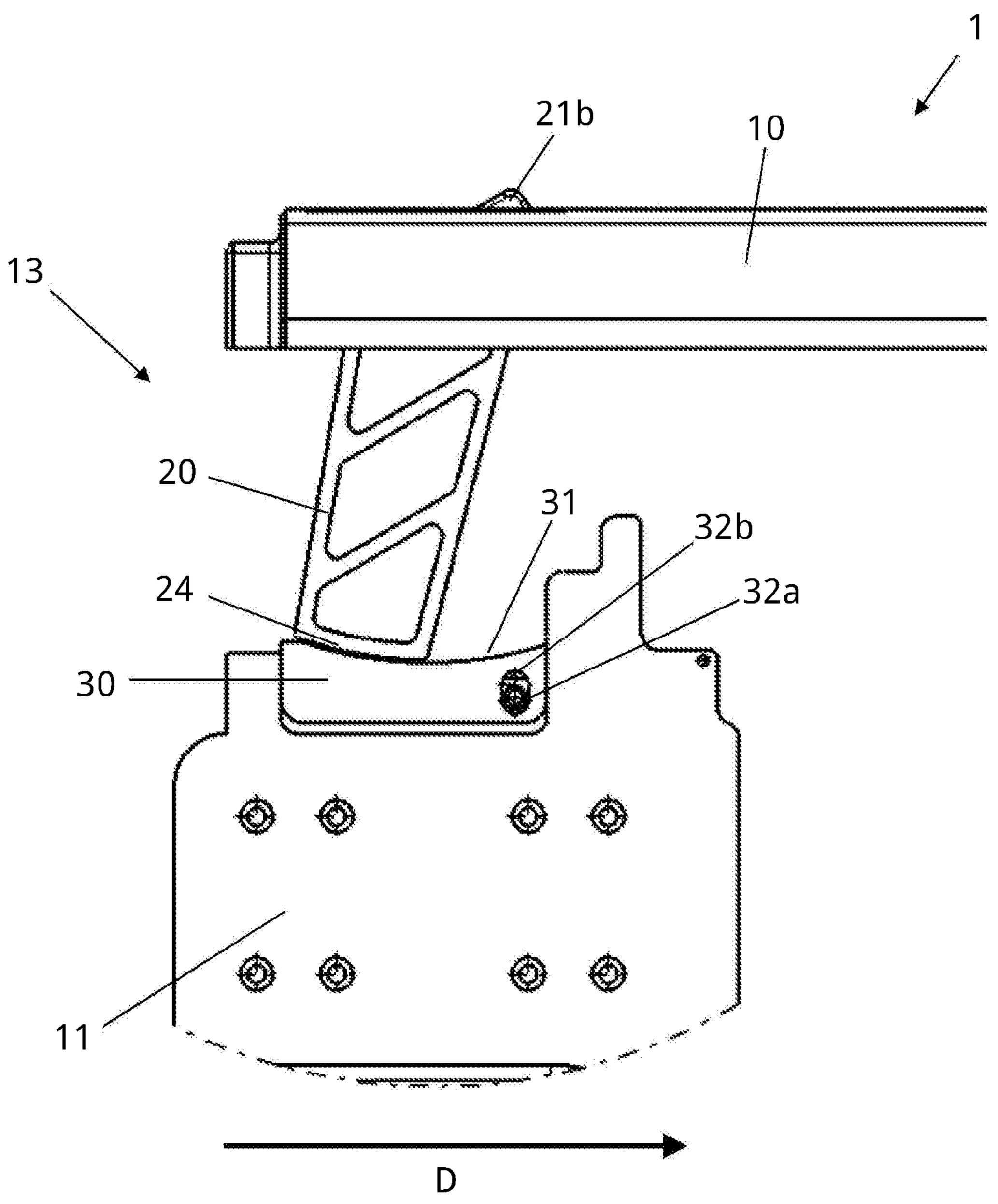
FIG. 4*a* shows a side view of a part of the aircraft interior assembly of FIG. 1, with the latch mechanism in a locked position and a sliding element in a lockable position.
Figure 4B:
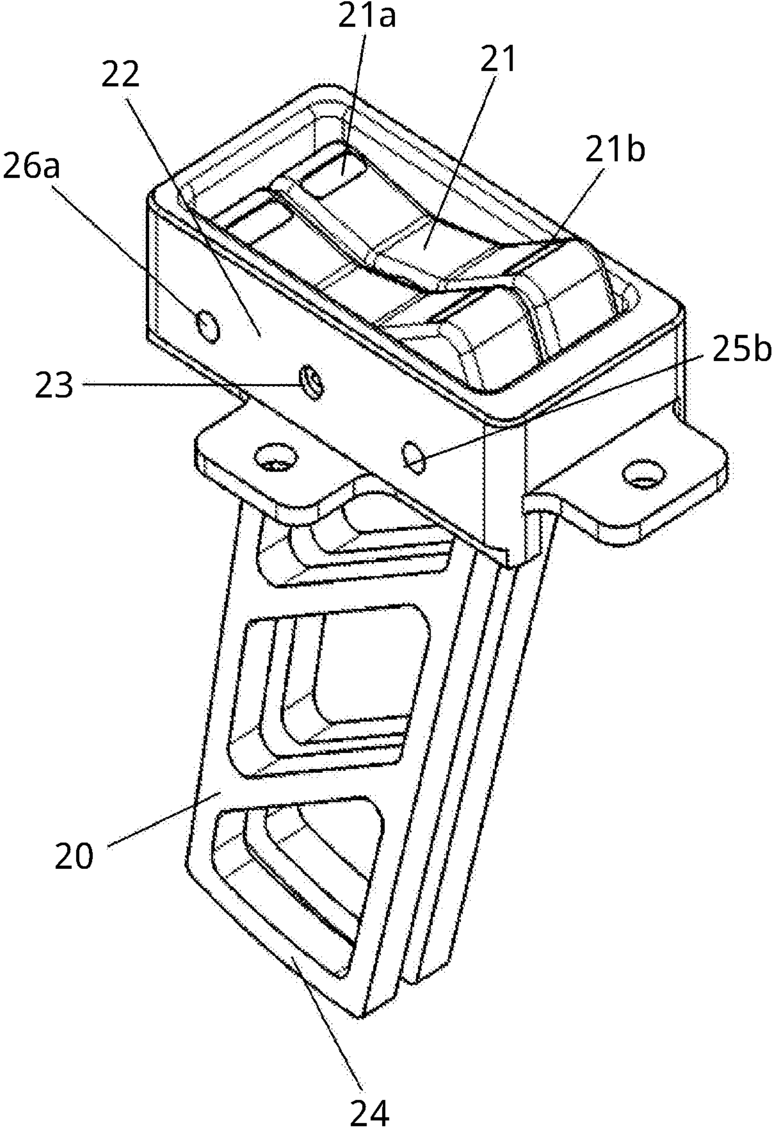
FIG. 4*b* shows a perspective view of the locking arms of the latch mechanism of the aircraft interior assembly of FIG. 1 in the locked position.

FIG. 4*a* shows a side view of the aircraft interior assembly 1 with the latch mechanism 13 in the locked position, and the sliding element 11 in the lockable position. FIG. 4*b* shows the locking arms 20 only in this locked position.

The engagement plate 30 can be seen in more detail in FIG. 4*a*. The engagement plate 30 is mounted in a recess in the top end of the sliding element 11, by means of a screw fixing 32*a* positioned through a vertically elongated hole 32*b* in the engagement plate 30. This allows the vertical position of the engagement plate 30 with respect to the sliding element 30 to be adjusted.

The engagement plate 30 has at its top a curved engaging surface 31. Similarly to the engagement end 24 of the locking arms 20, the curve of the engagement surface 31 is, when the sliding element 11 is in the lockable position shown in FIG. 4*a*, an arc of the circle which has as its centre the rotating axis of the locking arms 20. In this way, as can be seen in FIG. 4*a*, the engagement end 24 of the locking arms 20 and the engaging surface 31 of the engagement plate 30 are aligned along their length.

In FIG. 4*a* the sliding element 11 is in the lockable position, and the latch mechanism 13 is in the locked positon. It can be seen that, were an attempt to be made to move the sliding element 11 in the direction D to the released position, the movement of the sliding element 11 would be prevented by the latch mechanism 13. In particular, for the sliding element 11 to move in the direction D, the engaging surface 31 of the engagement plate 30 would need to move the locking arms 20 vertically in the direction of the pivot 23, due to the engaging surface 31 of the engagement plate 30 coming into contact with the engagement end 24 of the locking arms 20. However, the locking arms 20 are fixed by the pivot 23 to the housing 22, and the housing 22 is in turn fixed to the fixed element 10. Thus, the locking arms 20 cannot move vertically towards the pivot 23, as would be required if the sliding element out of the lockable position. In this way, the locking arms 20 being in the locked positon prevents the sliding element 11 moving out of the lockable position.

Figure 5A:
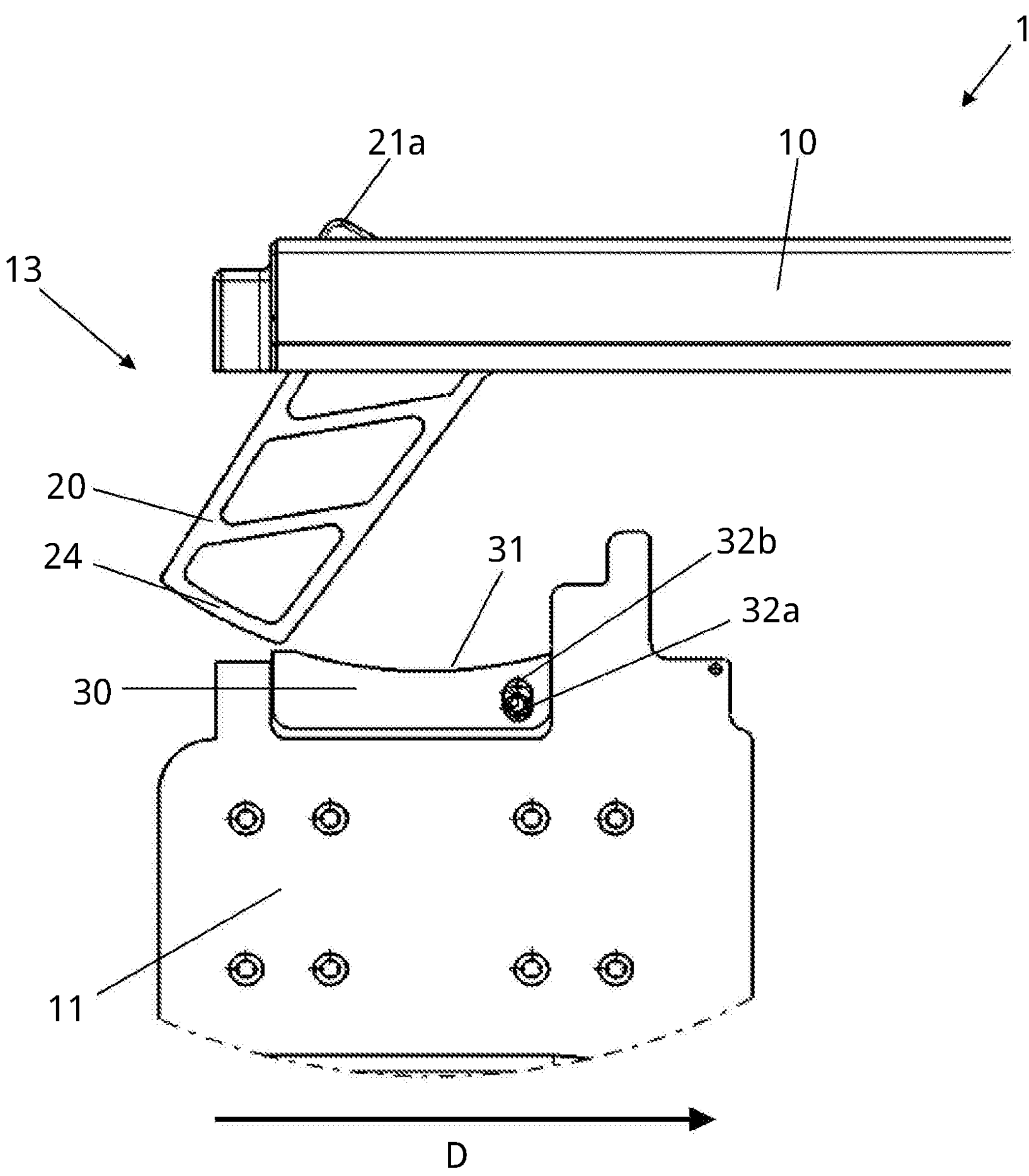
FIG. 5*a* shows a side view of a part of the aircraft interior assembly of FIG. 1, with the latch mechanism in an unlocked position and the sliding element in the lockable position.
Figure 5B:
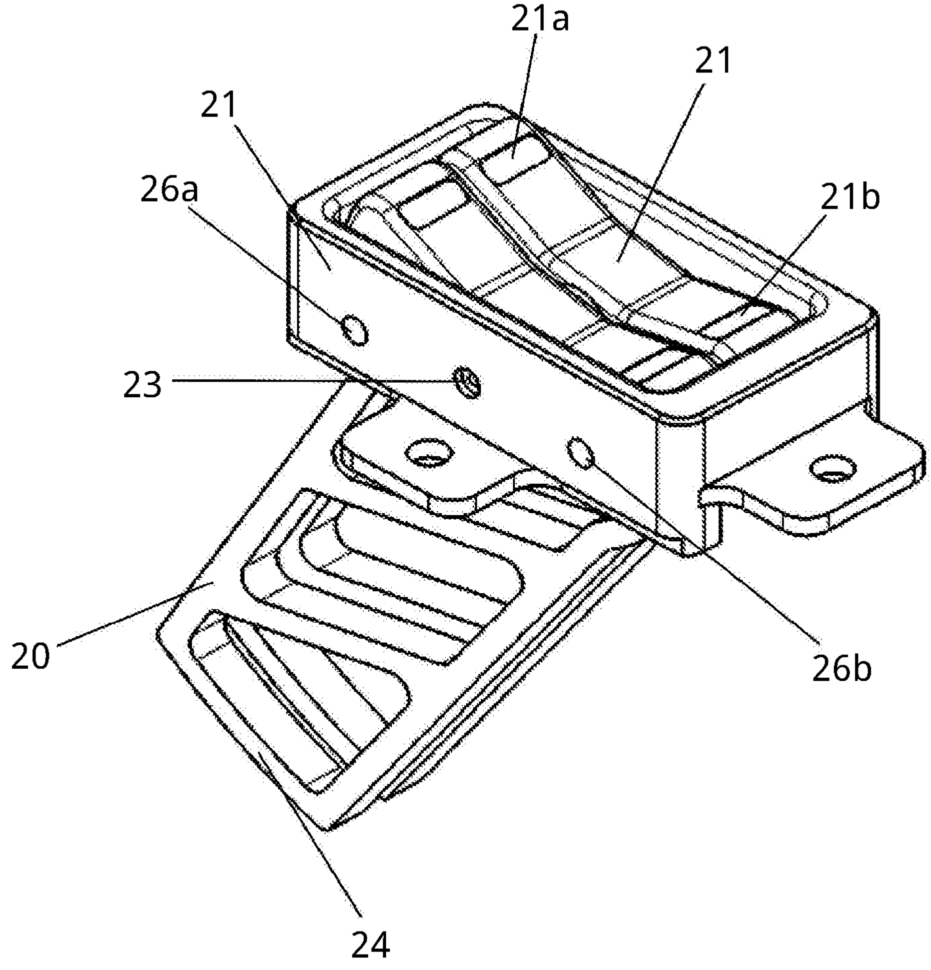
FIG. 5*b* shows a perspective view of the locking arms of the latch mechanism of the aircraft interior assembly of FIG. 1 in the locked position.

FIG. 5*a* shows a side view the aircraft interior assembly 1 with the latch mechanism 13 in the unlocked position and the sliding element 10 in the lockable position. FIG. 5*b* shows the locking arms 20 only in this unlocked position.

The locking arms 20 have been moved from the locked position shown in FIG. 4*a* to the unlocked position shown in FIG. 5*a* by a force being exerted on the unlocking area 21*b* of the rocker 21 of the locking arms 20. This has caused the locking arms to rotate clockwise around the rotating axis defined by the pivot 23 into the unlocked position.

As discussed above, both the surface of the engagement end 24 of the locking arms 20 and engaging surface 31 of the engagement plate 30 are arcs of the circle which has as its centre the rotating axis defined by the pivot 23. This means that, when the locking arms 20 rotate, the surface of the engagement end 24 moves along that circle, and consequently the curved surfaces of the engagement end 24 of the locking arms 20 and the engaging surface 31 of the engagement plate 30 will continue to be aligned. This allows the locking arms 20 to be rotated into the unlocked position shown in FIG. 5*a* without being prevented from doing so by the engagement plate 30. (And similarly, the locking arms 20 can be rotated back into the locked position, if desired.)

As can be seen in FIG. 5*a*, once the locking arms 20 are in the locked position, the engagement end 24 of the locking arms 20 is no longer in contact with the engaging surface 31 of the engagement plate 30, and in particular the lowest point of the locking arms 20 is above the highest point of the engagement plate 30. This means that the sliding element 11 is free to move in the direction D, from the lockable positon to the released position.

Figure 6:
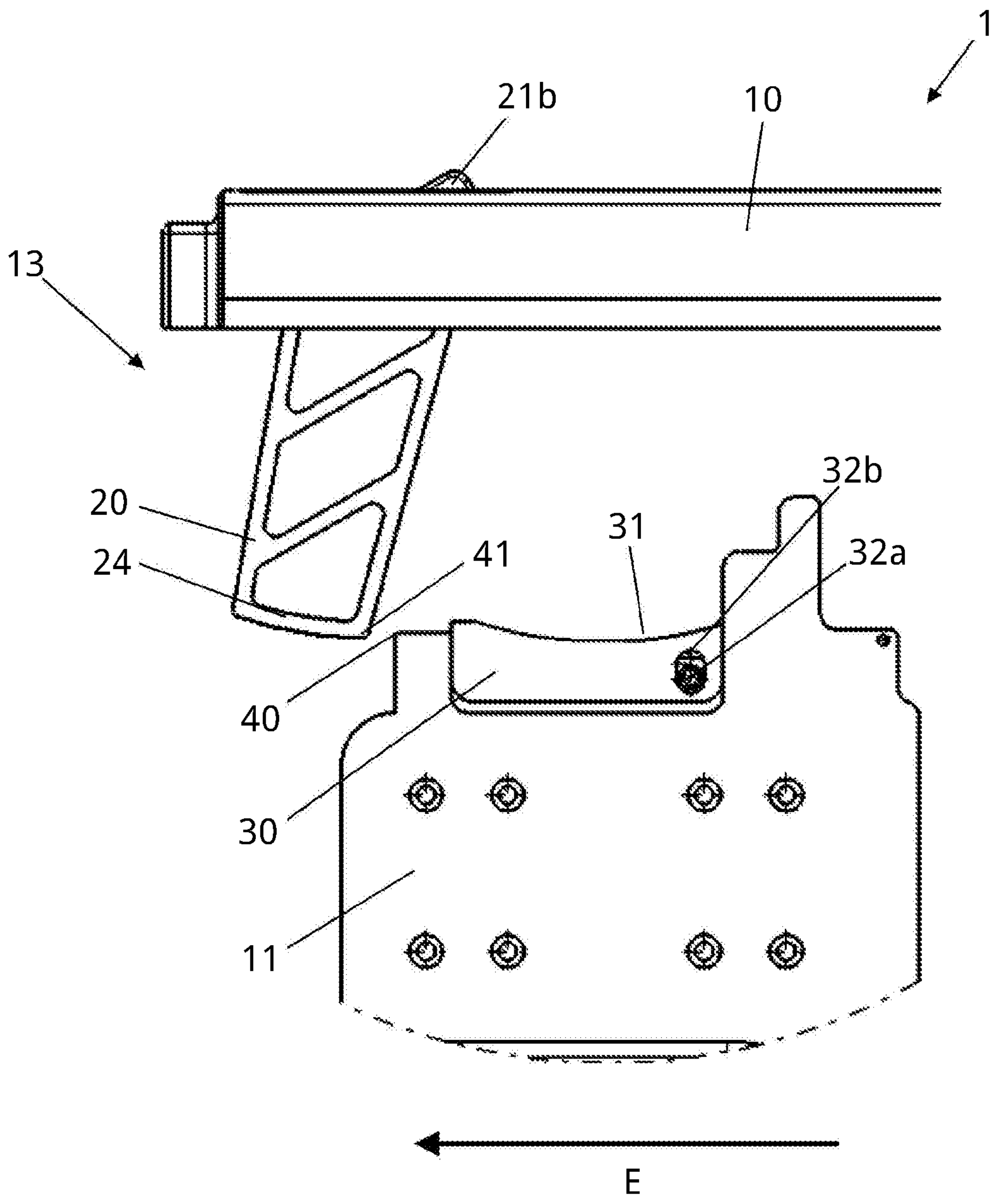
FIG. 6 shows a side view of a part of the aircraft interior assembly of FIG. 1, with the latch mechanism in the locked position and the sliding element not in the lockable position.

FIG. 6 shows a side view the aircraft interior assembly 1 with the latch mechanism 13 in the locked position and the sliding element 10 not in the lockable position. In other words, the sliding element 10 has been moved out of the lockable position by sliding it in the opposite direction to the direction E (i.e. in the direction D shown in FIGS. 4*a* and 5*a*), following the locking arms 20 having been put into the unlocked position as shown in FIGS. 5*a* and 5*b*.

It can be seen that, as the locking arms 20 are in the locked position, if the sliding element 11 is moved in the direction E, eventually the corner 40 of the sliding element 11 will come into contact with the side 41 of the locking arms 20. However, this will merely cause the locking arms 20 to be rotated clockwise around the pivot 23 by the sliding element 11, i.e. the sliding element 11 will move the locking arms 20 towards, and potentially even fully into, the unlocked position. This means that the sliding element 11 is not prevented from moving from the released position back to the lockable position, even if the locking arms 20 are in the locked position.

While the present invention has been described and illustrated with reference to particular embodiments, it will be appreciated by those of ordinary skill in the art that the invention lends itself to many different variations not specifically illustrated herein. By way of example only, certain possible variations will now be described.

While in the present embodiment the aircraft interior assembly 1 provides a door to an aircraft seat assembly, it will be appreciated that in other embodiments the aircraft interior assembly could be any other assembly found in an aircraft interior requiring a sliding element that can be retained in position, including for example a sliding door to a cupboard or other storage, an area divider or any other appropriate assembly.

While in the described embodiment the locking arms are moved by a rocker at the top of the locking arms, in other embodiments other means may be used to move the locking arms, for example a lever, handle, motorised means or any other any other suitable means.

While in the described embodiment sprung detents are present to hold the locking arms in the locked and unlocked positions, in other embodiments other means may be used to hold the locking arm or arms in place, or they may not be held in place in the unlocked and/or locked position. In some embodiments the locking arm or arms may be biased to move to the locked position, for example by a tension spring or any other suitable biasing means.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft interior assembly comprising:

a fixed element;

a sliding element movable between a lockable position and a released position;

a latch mechanism comprising:

a locking arm, mounted on one of the fixed element and the sliding element, the locking arm having an engagement end and being rotatable around a rotating axis between a locked position and an unlocked position;

an engagement plate mounted on the other of the fixed element and the sliding element, the engagement plate comprising an engaging surface;

wherein when the sliding element is in the lockable position and the locking arm is in the locked position, the engagement end of the locking arm contacts the engaging surface of the engagement plate to prevent the sliding element moving out of the lockable position;

wherein when the sliding element is in the lockable position and the locking arm is in the unlocked position, the engagement end of the locking arm is not in contact with the engaging surface of the engagement plate so that the sliding element is free to move out of the lockable position; and wherein the engaging surface of the engagement plate is shaped such that, when the sliding element is in the lockable position, the surface is an arc of a circle having as its center the rotating axis of the locking arm.

2. An aircraft interior assembly as claimed in claim 1, wherein the locking arm is mounted on the fixed element, and the engagement plate is mounted on the sliding element.

3. An aircraft interior assembly as claimed in claim 1, wherein the sliding element is movable in a plane perpendicular to the rotating axis of the locking arm.

4. An aircraft interior assembly as claimed in claim 1, wherein the end of the locking arm opposite the engagement end comprises a locking area which when pushed rotates the locking arm into the locked position.

5. An aircraft interior assembly as claimed in claim 1, wherein the end of the locking arm opposite the engagement end comprises an unlocking area which when pushed rotates the locking arm into the unlocked position.

6. An aircraft interior assembly as claimed in claim 5, wherein the end of the locking arm opposite the engaging end comprises a rocker.

7. An aircraft interior assembly as claimed in claim 1, wherein the surface of the engagement end of the locking arm is an arc of a circle having as its center the rotating axis of the locking arm.

8. An aircraft interior assembly as claimed in claim 1, wherein the engagement plate is adjustably mounted on the fixed element or sliding element so that a distance between the engaging surface of the engagement plate and the rotating axis of the locking arm is adjustable.

9. An aircraft interior assembly as claimed in claim 1, wherein the locking arm is removably mounted on the fixed element or sliding element.

10. An aircraft interior assembly as claimed in claim 1, wherein, when the sliding element is in the released position and the locking arm is in the locked position, movement of the sliding element into the lockable position causes the locking arm to be rotated out of the locked position.

11. An aircraft interior assembly as claimed in claim 9, arranged so that, during movement of the sliding element into the lockable position the engagement plate is brought into contact with the locking arm to rotate the locking arm out of the locked position.

12. An aircraft interior assembly as claimed in claim 9, wherein the locking arm is biased to return to the locked position.

13. An aircraft interior assembly as claimed in claim 1, wherein the sliding element is a sliding door.

14. An aircraft interior assembly as claimed in claim 1, wherein the aircraft interior assembly is an aircraft seat assembly.

* * * * *